R. E. BORING.
CUSHION WHEEL.
APPLICATION FILED DEC. 28, 1906.
969,596.
Patented Sept. 6, 1910.
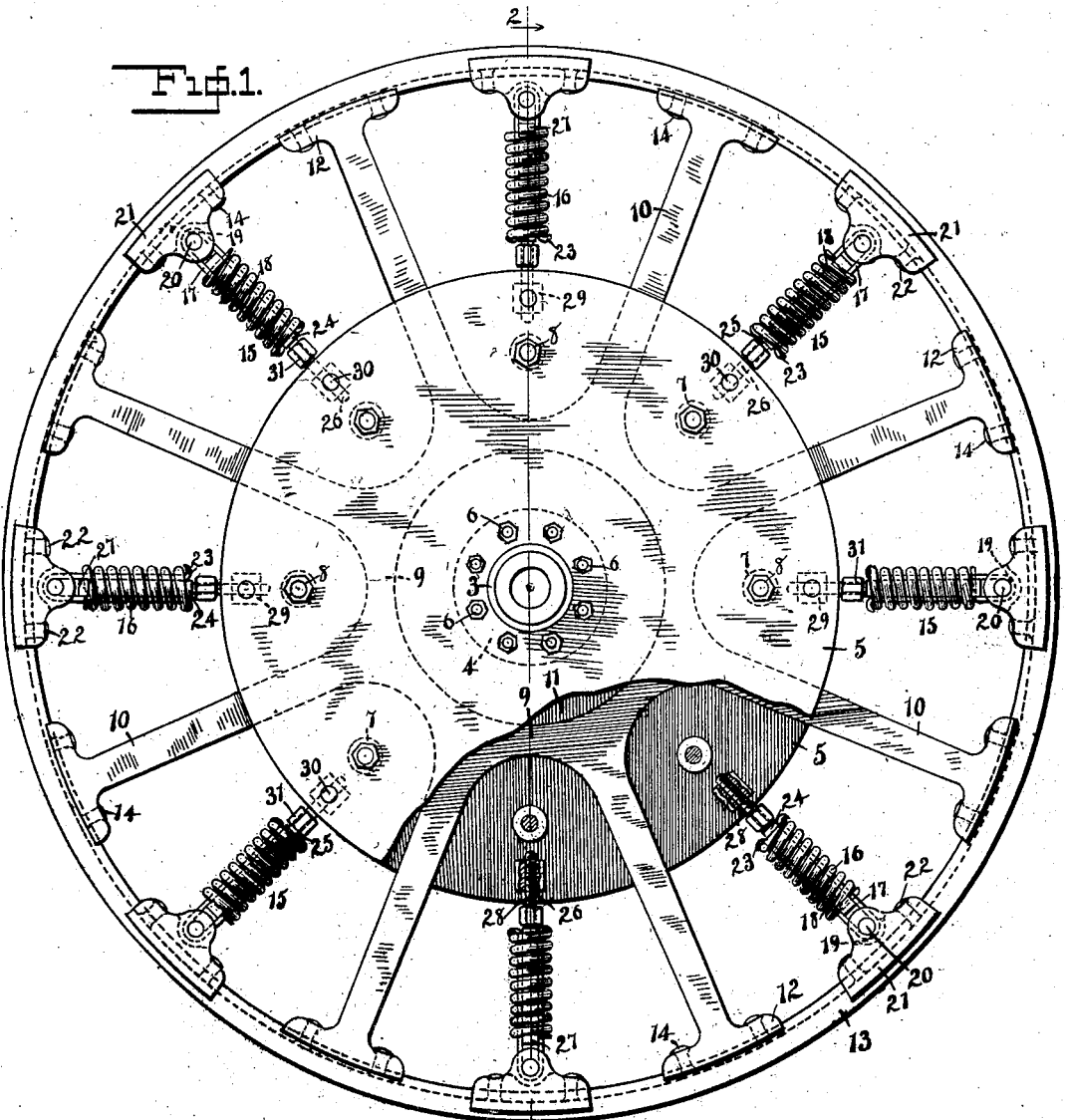
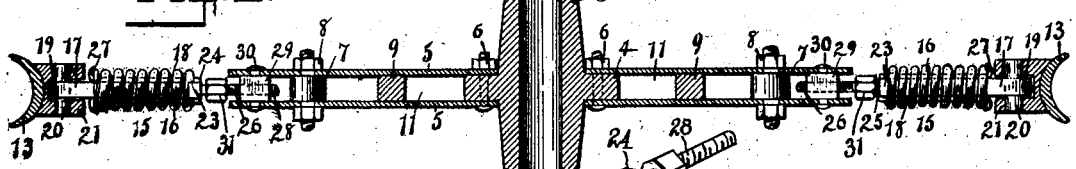
Witnesses:
Matthew J. Marty
C. F. Bassett
Inventor
R. E. Boring
By Frederick Benjamin
Att'y.

UNITED STATES PATENT OFFICE.

ROBERT E. BORING, OF CARLINVILLE, ILLINOIS.

CUSHION-WHEEL.

969,596.

Specification of Letters Patent.

Patented Sept. 6, 1910.

Application filed December 28, 1906. Serial No. 349,858.

*To all whom it may concern:*

Be it known that I, ROBERT E. BORING, citizen of the United States, residing at Carlinville, in the county of Macoupin and State of Illinois, have invented certain new and useful Improvements in Cushion-Wheels, of which the following is a specification.

My invention relates to vehicle wheels and has special reference to that class of wheels designed to have a certain resiliency, thus relieving the jar or shock from uneven roads or obstacles over which the wheels may pass.

The chief objects of my invention are to produce a wheel for the purpose stated of such design that the weight of the vehicle will be carried on a yielding construction and thus relieve the jolt and jar, thus avoiding the necessity of using body springs with vehicles of ordinary weight; to furnish a wheel for heavy vehicles such as automobiles that will give an easy riding motion without the employment of pneumatic tires; to provide a resilient wheel that will readily yield to radial impulses and at the same time offer great resistance to lateral strains; and to construct a wheel of the class specified on such lines that the frame will be strong, easily repaired and have lasting qualities.

Further objects of my improvement are to produce a spring wheel having a mechanical construction that will be economical to manufacture; that can be readily dismantled for repairs and that will not require special tools or appliances for assembling; and to furnish means for adjusting the yielding parts to suit varying loads or to compensate for wear and structural changes which may take place in the material used in construction.

I accomplish the above and other minor results by the employment of the appliance illustrated in the accompanying drawing which forms a part of this specification and in which:—

Figure 1 is a side view of my improved spring vehicle wheel, and Fig. 2 is a sectional view on the line 2—2 of Fig. 1. Fig. 3 is a detail perspective view of the hangers separated from each other.

Referring to the drawing, 3 indicates the hub of a wheel adapted for automobile use. The hub is provided in the median line with a flange 4 which completely surrounds the periphery and to which are secured circular plates 5, one on each side of the flange, held rigidly thereto by bolts 6, a sufficient number of the latter being used to give the required strength. The said plates are less in diameter than the wheel and are maintained parallel to each other by spacing collars 7, held in place near the peripheral margins of said plates by bolts 8. The said spacing collars are placed at regular intervals concentrically to the wheel center and may vary in number according to the dimensions of the structure. Between said plates is located a spider consisting of a circular ring 9 from which radiate arms or spokes 10 corresponding in number with the spacing collars. The central aperture or opening 11 of said spider surrounds the hub and is sufficiently large to prevent any danger of engaging the flange of the hub when the spider is decentered as will be hereinafter explained. The said ring and spokes are formed integral and the peripheral ends of the latter are provided with laterally projecting lugs 12 by means of which the spokes are rigidly fastened to a rim 13 adapted to receive a tire of any desired variety, the rim illustrated being designed for a cushion tire. The spokes may be secured by screws or rivets 14 to the rim, the latter fastening being preferred.

The spokes 10 and attached rim 13 are yieldingly held so that the central opening is normally concentric with the wheel center by a plurality of resilient tie members 15 corresponding in number with the spokes, and alternating therewith. Each member is composed of a spiral compression spring 16 suspended by hangers 17, 18 which are formed of flat bars bent upon themselves to form loops and then threaded through the cavity of the spring. The hangers 17 are formed with rounded bends 19 which engage pivots 20 supported in brackets 21 attached to the rim 13 by rivets 22 midway between the attachments of the adjacent spokes. The free ends 23 of the hanger 17 after passing through the spring are recurved to engage the spring at the end toward the center of the wheel. The hanger 18 is provided with a square bend 24 which is drilled to receive the swivel 25 of a swivel bolt 26. The free ends 27 of the hanger 18 are recurved to embrace the peripheral end of the spring coil in the same manner as in the case of the companion hanger. The swivel-bolts 26 are furnished with threads 28 which engage threads in nuts 29 secured in the interval between the plates 5 by rivets 30 and are provided with heads 31 by means of which the said bolts may be turned for adjustment. As the ends 23, 27 of the hangers grasp opposite ends of the spring it follows that any tension made upon the tie member in a line with the axis of the spring will have a compressing effect and relieving the tension will allow the spring to expand. The plates 5 are made proportionally wide to form a lateral support for the spider which is received into the interval between them and with which they have a sliding engagement. This affords a rigid construction which will strongly resist lateral thrusts but will allow of radial displacement since the plates offer no appreciable resistance in that direction.

It will be evident that when the tie members 15 have been properly adjusted by the swivel bolts so as to centralize the hub relatively to the periphery of the rim any pressure upon one side will be transmitted to the entire structure causing deflection of the spider i. e. it will be decentered. This eccentricity will be constantly shifting as the wheel revolves and as the pressure is varied. The relation between the load and the tension of the tie members having been predetermined the parts may within certain limits be considered in equilibrium, and the give or yielding of the resilient tie members will result in an average deflection producing an oscillating motion which will give an easy riding movement.

It is evident that changes may be made in the details of construction of my invention as herein disclosed without departing from the spirit and scope thereof and I do not wish, therefore, to be limited to the precise form of structure set forth.

Having thus described my invention what I claim as new and desire to secure by Letters Patent, is:—

In a cushion wheel, a hub provided with a centrally located annular flange, spaced annular plates engaged with the hub and secured to the flange, a movable spider located between the plate and guided in its movement thereby, said spider comprising an annular plate provided with radial spokes, spacing collars located between the spokes, removable fastenings engaged with the said spacing collars and with the said plates, said spider having a centrally located opening of a greater diameter than that of the flange of the hub so that the walls of the opening in the spider are spaced from the peripheral surface of the said hub flange, a rim secured to the spokes, nuts pivoted between the said annular plates and arranged in radial alinement with the said spacing collars, compression springs interposed between the annular plates and the rim, inner and outer loop members extending through each spring, the said outer members being pivotally connected with the said rim and having portions bent into engagement with the springs, the said inner members having portions bent into engagement with the springs at the opposite ends thereof, and adjusting bolts connecting the said inner members with the said nuts.

In testimony whereof I affix my signature in presence of two witnesses.

ROBERT E. BORING.

Witnesses:
JEM PEEBLES,
JOHN HOMER, Jr.